United States Patent
Süss et al.

(10) Patent No.: US 12,485,594 B2
(45) Date of Patent: Dec. 2, 2025

(54) INJECTION MOULD

(71) Applicant: MHT Mold & Hotrunner Technology AG, Hochheim (DE)

(72) Inventors: Peter Süss, Messel (DE); Christian Tilsner, Weiterstadt (DE); Christian Wagner, Mainz (DE)

(73) Assignee: MHT Mold & Hotrunner Technology AG, Hochheim (DE)

( * ) Notice: Subject to any disclaimer, the term of this patent is extended or adjusted under 35 U.S.C. 154(b) by 230 days.

(21) Appl. No.: 18/024,197

(22) PCT Filed: Aug. 26, 2021

(86) PCT No.: PCT/EP2021/073580
§ 371 (c)(1),
(2) Date: Mar. 1, 2023

(87) PCT Pub. No.: WO2022/048982
PCT Pub. Date: Mar. 10, 2022

(65) Prior Publication Data
US 2023/0271362 A1 Aug. 31, 2023

(30) Foreign Application Priority Data
Sep. 2, 2020 (DE) .......................... 102020122968.2

(51) Int. Cl.
*B29C 45/26* (2006.01)
*B29C 45/17* (2006.01)
(Continued)

(52) U.S. Cl.
CPC ...... *B29C 45/2612* (2013.01); *B29C 45/1769* (2013.01); *B29C 45/33* (2013.01); *B29C 2045/2683* (2013.01); *B29C 49/06* (2013.01)

(58) Field of Classification Search
CPC ................................................ B29C 45/2612
See application file for complete search history.

(56) References Cited

U.S. PATENT DOCUMENTS 3,479,690 A * 11/1969 Reinold ............ B29C 49/28008
425/149
3,764,250 A * 10/1973 Waterloo ................ B29C 49/04
425/453
(Continued)

FOREIGN PATENT DOCUMENTS

DE       10147191 A1    4/2003
DE   102017101331 A1    7/2018
(Continued)

OTHER PUBLICATIONS

International Search Report (with partial translation) and Written Opinion dated Nov. 17, 2021, issued in corresponding International Patent Application No. PCT/EP2021/073580.
(Continued)

*Primary Examiner* — Timothy Kennedy
(74) *Attorney, Agent, or Firm* — Morgan, Lewis & Bockius LLP

(57) ABSTRACT

Injection mould for producing mouldings having a cavity plate with cavities and a core plate with cores. The cavity plate and the core plate are movable between a closed position, in which each core is respectively arranged in a cavity, and an open position, in which no core is arranged within a cavity. Each moulding space is assigned a neck-ring pair with two neck rings, and the neck-ring pair is arranged on the core plate and is movable between a holding position, in which neck rings of the neck-ring pair are in contact, and a releasing position, in which neck rings of the neck-ring pair are not in contact. To provide an injection mould with which mouldings can be produced and provided for further processing as efficiently as possible, the cores and the cavities are arranged on a curved path.

20 Claims, 11 Drawing Sheets

(51) Int. Cl.
  *B29C 45/33* (2006.01)
  *B29C 49/06* (2006.01)

(56) References Cited

U.S. PATENT DOCUMENTS

| | | | | |
|---|---|---|---|---|
| 4,233,010 | A | * | 11/1980 | Suzuki .................. B29C 49/68 |
| | | | | 425/534 |
| 4,285,657 | A | * | 8/1981 | Ryder ................. B29C 45/7337 |
| | | | | 425/530 |
| 5,118,273 | A | | 6/1992 | Murayama et al. |
| 5,424,022 | A | * | 6/1995 | Koga ................ B29C 49/42073 |
| | | | | 425/534 |
| 5,433,916 | A | | 7/1995 | Budzynski et al. |
| 5,470,221 | A | | 11/1995 | Gaiser |
| 6,368,094 | B1 | | 4/2002 | Dennis et al. |
| 10,787,324 | B2 | | 9/2020 | Neubauer |
| 2002/0127298 | A1 | | 9/2002 | Harrison et al. |
| 2005/0225008 | A1 | | 10/2005 | Deardurff et al. |
| 2007/0018355 | A1 | | 1/2007 | Steele |
| 2015/0352760 | A1 | | 12/2015 | Zoppas et al. |
| 2017/0072606 | A1 | | 3/2017 | Duclos et al. |

FOREIGN PATENT DOCUMENTS

| | | |
|---|---|---|
| DE | 102018217777 A1 | 4/2020 |
| EP | 0228106 A1 | 7/1987 |
| EP | 1273417 A2 | 1/2003 |
| EP | 2361745 A2 | 8/2011 |
| EP | 2546176 B1 | 1/2016 |
| EP | 3113925 B1 | 6/2018 |
| EP | 2633976 B1 | 7/2019 |
| EP | 2483050 B1 | 8/2019 |
| WO | 2014/111905 A2 | 7/2014 |
| WO | 2020/041886 A1 | 3/2020 |

OTHER PUBLICATIONS

Office Action dated Mar. 23, 2021, issued in corresponding German Patent Application No. 102020122968.2.

* cited by examiner

INJECTION MOULD

The present invention relates to an injection mould for producing mouldings having a cavity plate which has cavities, the inner contour of which corresponds at least to a portion of the outer contours of the mouldings to be produced, and a core plate which has cores, the outer contour of which corresponds at least to a portion of the inner contours of the mouldings to be produced, wherein the cavity plate and the core plate are movable back and forth relative to one another between a closed position, in which each core is respectively arranged in a cavity, and an open position, in which no core is arranged within a cavity, wherein, in the closed position, a moulding space for receiving a plasticized melt is formed by each cavity and the core arranged therein, wherein each moulding space is assigned a neck-ring pair made up of two neck rings, wherein the inner contour of the neck-ring pair corresponds to a portion of the outer contour of the moulding to be produced, wherein the neck-ring pair is arranged on the core plate and can be moved back and forth between a holding position, in which the two neck rings of the neck-ring pair are in contact with one another, and a releasing position, in which the two neck rings of the neck-ring pair are not in contact with one another.

Injection moulding is one of the most important methods for the production of plastic mouldings. The moulding material, generally provided originally as a powder or granule, is heated, plasticized, and pressed under high pressure into a corresponding mould. The moulding material solidifies in the mould and is then removed as a moulding from the opened tool.

Mouldings are understood to mean, for example, containers or premoulds that are further processed into the desired object in further processing steps. One example of a premould is a hollow body premould for producing PET bottles. The present invention is explained using the example of such a hollow body premould, but the invention can in principle also be used with other mouldings.

Commercially available PET bottles are generally produced by stretch-blow moulding of a hollow premould. The hollow premould is in this case produced in a first step by means of injection moulding. The stretch-blow moulding subsequent to the injection moulding process then takes place in a further production step. In this context, it is quite common for the locations of the individual production steps to be significantly distanced from one another. For example, the hollow body premould is produced and packaged at a first location and shipped to a second production site where the stretch-blow moulding takes place.

In recent years, the trend has been to process the hollow body premoulds in a production line from injection moulding to finished product. On the one hand, this saves time and transport costs, while on the other hand, the processing of the premoulds at the production site offers the further advantages of conserving energy and space, for example, because additional sorters or other machines are eliminated for handling the premoulds. A further advantage is that the stretch-blowing capacity of the premould is improved, because it is still uniformly heated by the preceding injection moulding process and therefore only a temperature control of the premould is not required to heat again. Also in the case of aseptic applications, a production site has the advantage that the likelihood of contamination is reduced. Production lines are already known for this purpose from the prior art, which, in addition to the actual injection mould, also comprise apparatuses for follow-up treatment, such as coating or stretch-blow moulding of the hollow body premoulds.

At this point, however, it is problematic to transport the premoulds from one machine portion to the next machine portion. For example, if the premoulds produced using the injection mould are ejected unsorted onto a conveyor belt, then a realignment of the produced premoulds is necessary in the next production step. This in turn costs additional time, which in particular should be kept as low as possible for the production of several thousand premoulds within a short time.

The problem addressed by the present invention is therefore to provide an injection mould with which mouldings can be produced as efficiently as possible and made available for a further machining process.

This problem is solved by an injection mould for producing mouldings having a cavity plate which has cavities, the inner contour of which corresponds at least to a portion of the outer contours of the mouldings to be produced, and a core plate which has cores, the outer contour of which corresponds at least to a portion of the inner contours of the mouldings to be produced, wherein the cavity plate and the core plate are movable back and forth relative to one another between a closed position, in which each core is respectively arranged in a cavity, and an open position, in which no core is arranged within a cavity, wherein, in the closed position, a moulding space for receiving a plasticized melt is formed by each cavity and the core arranged therein, wherein each moulding space is assigned a neck-ring pair made up of two neck rings, wherein the inner contour of the neck-ring pair corresponds to a portion of the outer contour of the moulding to be produced, wherein the neck-ring pair is arranged on the core plate and can be moved back and forth between a holding position, in which the two neck rings of the neck-ring pair are in contact with one another, and a releasing position, in which the two neck rings of the neck-ring pair are not in contact with one another, wherein the cores and the cavities are arranged on a curved path.

In a preferred embodiment, the injection mould according to the invention operates according to the principle of a vertical tool known from the prior art. Vertical means that the core plate is arranged on a vertical axis above or below the cavity plate, such that, when the cavity plate and/or the core plate are moved on the common axis, the cores arranged on the core plate dip into the cavity plate when the cavity plate and the core plate move towards one another.

In the closed position of the injection mould, a core of the core plate is then arranged in each cavity of the cavity plate. The core and cavity are in this case designed such that the core does not completely fill the cavity, but instead the so-called moulding space forms between the cavity and the core, which is filled with a plasticized melt and determines the shape of the moulding.

Neck-ring pairs are typically used in order to form a threading of a moulding. In order to demould the moulding after the injection moulding has been performed, it is necessary to remove the moulding from the moulding space, for example in that the mould core is moved out of the cavity and the neck-ring pairs strip the moulding from the mould core before the neck-ring pairs separate into a releasing position and the moulding becomes free.

To remove the mouldings from the injection mould, it is provided in one embodiment that the core plate is pivotable about a pivot axis in the open position.

In a further embodiment, a removal apparatus is provided, which, in the open position, is movable between the core plate and the cavity plate and is provided for removing produced mouldings from the cores or the cavity.

In the open position, there is no core within a cavity, so that it is possible for a removal apparatus to be moved between the core plate and the cavity plate. For example, this removal apparatus can be positioned below the core plate and can remove the mouldings produced using the injection mould that are still adhered to the cores and feed a further machining step or transport apparatus. Alternatively, the produced mouldings still in the cavity could also be sucked in by the removal apparatus.

According to this embodiment, it is thus provided that the core plate and the cavity plate can be moved at least so far apart that a removal apparatus can be guided between the core plate and the cavity plate.

The arrangement of the cores and cavities on a curved path also offers the advantage that the removal apparatus can be arranged at a central position in the injection mould, and thus all cores or cavities for removing the mouldings are achievable within a short time. In one embodiment, the removal apparatus is in this case configured such that mouldings can be removed simultaneously using the removal apparatus.

A movement of the core or cavity plates beyond the movement between the closed and open position is not necessary according to the invention, because the removal apparatus transfers the mouldings from the injection mould to further processing devices. This offers the advantage that the injection mould can be stationary, for example, whereby the feeding of the plasticized melt is significantly simplified, because the supply lines do not have to be moved. This facilitates the sealing of the hotrunner; less leakage occurs, and the hotrunner is less complex in production, because no rotary feed-through is necessary.

In a further embodiment, two slider elements are provided, which are arranged and configured in such a way that one neck ring of the neck-ring pair cooperates with the one slider element, while the other neck ring of the neck-ring pair cooperates with the other slider element, so that, when the injection mould is moved from the closed position into the open position, the neck rings are moved from their holding position into the releasing position by a movement of the slider elements.

It is in this case possible that a slider element can also actuate the neck rings of, for example, adjacent neck-ring pairs simultaneously so that neck rings can be moved simultaneously by the movement of a slider element.

In a further embodiment, it is also conceivable that two individual slider elements be associated with each moulding space, which elements only move the neck-ring pairs of the respective moulding space. Thus, a demoulding process can occur individually for each moulding space.

In a further embodiment, the slider elements are integrated in the neck-ring pairs, i.e., the neck-ring pairs themselves have a corresponding possibility for moving the neck rings relative to one another.

In a further embodiment, it is provided that the cores and the cavity are arranged on a circular arc, in which case the slider elements are preferably circularly arcuate in form. This offers the advantage that a removal apparatus arranged at the centrepoint of such a circular arc can equally quickly reach all mouldings produced in a pair consisting of cavity and core. For example, only a rotational movement of the removal apparatus is necessary. Thus, an individual start-up of each core-cavity pair is not required, which can save time. In a further embodiment, the pivot axis of the core plate can also be arranged at the centrepoint of the circular arc.

The axis of movement of the slider elements corresponds in this case to a radial direction of the circular arc. This offers the advantage that the slider elements do not interfere with one another's movement when moved from the connected position into the releasing position.

In a further embodiment, the cores and the cavities are arranged on a circular arc having a centrepoint angle, with the centrepoint angle being <180° and preferably <120°. This ensures that a movement of the slider elements is not obstructed by adjacent pairs of cavities and cores. In addition, the injection mould thus offers a side at which no cores or cavity are arranged, so that the produced mouldings can be removed particularly easily here when the removal apparatus is pivotally arranged in a centrepoint of the circular arc or the core plate is pivotally arranged about a central pivot axis in the centrepoint of the circular arc.

In a further embodiment, the cores and the cavities are arranged on two concentric circular arcs of different radii. This offers the advantage that more moulding spaces can be provided on the same surface so that more mouldings can be produced in an injection moulding operation.

In a further embodiment, in this case, a removal apparatus is designed and configured such that the removal apparatus can remove mouldings from cavity or cores on the outer circular arc as well as cavity or cores on the inner circular arc. This is done by adjusting the removal apparatus to the radius of the respective circular arc. In particular, if the removal apparatus has individual removal elements, whereby each removal element removes a moulding, the radius of the removal apparatus can be changed, for example, in that either individual or all removal elements are movably arranged and thus can be arranged on circular arcs having the same radii as the circular arcs on which the cores or cavities are arranged. For example, each second removal element can be extendable such that it can be brought from the inner circular arc onto the outer circular arc, or the circular arc length of a circular arc on which the removal elements are arranged is conformable to the radius of the concentric circular arcs by movable removal elements.

In a particularly preferred embodiment, the adjustment movement of the removal elements is automatically initiated by the movement of the removal apparatus between the cavity plate and the core plate. If the removal apparatus is moved away from the cavity plate and core plate space again, the removal elements can be automatically moved back to a specific starting radius.

This offers the advantage that, using the same removal apparatus, the mouldings can be removed from both concentric circular arcs.

In a further embodiment, ends of the cavities or cores which are jointly mounted on an outer circular arc of the concentric circular arcs span a first plane, whereby ends of the cavities or cores which are jointly arranged on an inner circular arc of the concentric arcs span a second plane, with the first plane and the second plane being arranged parallel and spaced apart from one another. This means that the cavities or cores are arranged on the two different circular arcs so as to be offset in terms of height. For example, the cavities or cores are arranged deeper on the inner circular arc compared to those on the outer circular arc.

Such a configuration offers the advantage that the slider elements, which are also arranged on the respective circular arcs, cannot mutually impede their movement, but rather a slider element of the pairs consisting of core and cavity on the inner circular arc can be moved via a slider element of the pairs consisting of core and cavity on the outer circular arc, or vice versa.

In a further embodiment, a hotrunner is provided, which has an inlet for receiving a plasticized melt and outlets for delivering the plasticized melt to the cavities, with the hotrunner being arranged in such a way that the inlet is arranged in a centrepoint of the circular arc, whereby each cavity is associated with a hotrunner portion, which extends from a gate provided in the cavity to the inlet, in which case all hotrunner portions are straight and of the same length.

This arrangement can be realized easily with cavities or cores arranged on a circular arc, in that the inlet of the hotrunner is arranged in the centrepoint the circular arc. This ensures that the distance between the inlet of the hotrunner and the individual cavities is the same everywhere. In this case, little to no deflections and also no intersections or arrangements at different levels in the hotrunner are necessary, the pressure drop in the hotrunner is lower, and less volume must be guided in the hotrunner. Furthermore, tubular heating bodies for tempering the hotrunner can be arranged around the hotrunner such that there are also no intersections of the tubular heaters among one another or with the hotrunner portions, so that a very homogeneous temperature distribution in the hotrunner is ensured. Thus, the plasticized melt also has the same temperature in each moulding space, because the same distance must be travelled to each moulding space, and thus an identical cooling is carried out. This in turn results in a higher homogeneity within the produced mouldings produced in an injection moulding operation.

In a further embodiment, the pairs consisting of cavity and associated core form at least two groups, with the inner contour of the cavity and/or the outer contour of the core of the one group differing from the inner contour of the cavity and/or the outer contour of the core of the other group. Thus, mouldings having different contours can be produced in an injection moulding process.

In a further embodiment of the injection mould according to the invention, a transfer chain with gripping elements is provided for holding a produced moulding. In this context, the core plate is configured such that, using the core plate, the produced mouldings can be transferred in the open position from the cores to the gripping elements, or whereby the removal apparatus is configured in such a way that, using the removal apparatus, the produced mouldings can, in the open position, be removed from the cores or from the cavities and transferred to the gripping elements.

This offers the advantage that the mouldings produced do not drop onto a conveyor belt in a disordered manner, for example, but are rather kept in a defined position by the gripping elements. Thus, a re-sorting of the produced mouldings before the next machining step is unnecessary, so that time can be saved.

In the case of an injection mould with cavities and cores arranged on two concentric circular arcs, the transfer chain can also be arranged in two rows, so that mouldings of the one arc are transferred to the first row of the transfer chain and mouldings of the other arc are transferred to the second row of the transfer chain.

In the arrangement of the circular arcs on parallel, distanced planes, the rows of the transfer chain can in particular also be arranged at different planes, or the rows of the transfer chain can be arranged on one plane, and the height difference of the removed mouldings due to the different planes of the circular arcs is equalized by the removal apparatus.

In a further embodiment, the transfer chain has at least one transfer chain portion, in which the gripping elements are arranged on a straight line and whereby, using the removal apparatus, the produced mouldings can be transferred within this transfer chain portion to the gripping elements.

By using a separate removal apparatus that moves between the cavity plate and the core plate as well as the transfer chain, a movement of the cavity and core plate beyond a movement between the closed and open position is not necessary in order to convey the produced mouldings to the transfer chain.

However, even when the core plate is pivotally arranged so as to transfer the mouldings to the transfer chain, during the actual injection moulding operation, i.e., when the pairs consisting of cavities and cores are arranged in the closed position, no movement of the injection mould is provided. Thus, in one embodiment, all moulding spaces of the injection mould are simultaneously filled with the plasticized melt while the injection mould is not performing a motion.

In a further embodiment, a follow-up treatment element is provided, whereby the core plate or the removal apparatus transfers the mouldings removed from the injection mould to the follow-up treatment element, and whereby the follow-up treatment element transfers the mouldings to the transfer chain. In this embodiment, for example, the mouldings in the follow-up treatment element can first further cool down before being delivered to further processing steps. Furthermore, it is conceivable that the produced mouldings can be temperature-controlled, coated, deformed, sterilized, printed, pressurized, irradiated, filled, sealed, labelled, measured, quality-controlled, cleaned, chemically treated, packaged, weighed, re-orientated, sorted, removed, or (intermediately) stored. In addition, the produced mouldings can also be supplemented with a different plastic in a further injection moulding process if, for example, mouldings are to be produced with different plastics.

In a further embodiment, the cores and the cavities are arranged on a circular arc, with the removal apparatus being configured as a circular arc and being moved between the cavity plate and the core plate by a rotational movement, preferably about a centrepoint of the circular arc. The rotational movement also offers the advantage that it is possible to transfer the mouldings to a portion of a transfer chain on which the gripping elements are arranged in a line.

In order for the removal apparatus to perform a rotational movement, it must be ensured that the space between cavity and core plate is free and is not limited piecewise by spars, for example. Such spars extending between the cavity plate and the core plate are often used in vertical tools in order to increase the positioning accuracy of the cores relative to the cavity and to thereby minimize wear on the tool parts due to friction. However, the spars would impede a rotational movement of the removal apparatus, such that in a preferred embodiment of the injection mould according to the invention, it is a sparless tool or a sparless injection moulding machine overall.

In a further embodiment, the core plate and the cavity plate are configured so as to be movable towards one another such that the core plate is also moved in the cavity during the injection moulding process, such that very thin-walled mouldings, in particular thin-walled containers, are produced, for example, and thus material costs can be saved. The general principle of this injection moulding of thin-walled mouldings is described in EP 2 483 050 B1.

Moreover, the problem underlying the invention is solved by an injection moulding system having at least one injection mould according to any of the embodiments above described and an extruder, whereby the extruder is connected to the injection mould via a melt passage such that, during operation of the injection moulding system, the plasticized melt is guided from the extruder into the injection mould.

In one embodiment, the moulding space is in this case arranged stationary opposite the extruder in the closed position of the cavity plate and the core plate. This offers the already described advantage that no connection between a moving component, for example the moulding space, and the hotrunner must be created in order to direct the plasticized melt into the moulding space. Such connections are too complex in production and are susceptible to leakage. By arranging the moulding space in the closed position stationary opposite the extruder, i.e., the injection mould carries out no movement during the injection moulding operation in which preferably all moulding spaces are filled simultaneously, these disadvantages can be avoided.

In a further embodiment, the injection moulding system has at least two injection moulds as well as injection cylinders associated with the at least two injection moulds, with the at least two injection moulds being connected to an injection cylinder via the melt passage, whereby the injection cylinders are connected to the extruder via at least one further melt passage, whereby, during operation of the injection moulding system, the injection cylinders are alternately supplied with the plasticized melt from the extruder, such that either the one of the at least two injection moulds is in the closed position and the other injection mould of the at least two injection moulds is in the open position, or vice versa.

It us understood that more than two injection moulds can also be combined into one system. Feeding two or more injection moulds with an extruder offers the advantage that the extruder can produce continuously plasticized melt. Conversely, if only one injection moulding is filled, the extrusion must be stopped again and again until the injection moulding operation in the tool is complete and can begin anew. If two or more injection moulds are available, the one tool can be fed with plasticized melt while the other tool is already filled up and the injection moulding operation is finished.

Further advantages, features, and possible applications will become apparent from the following description of preferred embodiments and the associated drawings. Like components bear the same reference signs in this context.

Figure 1:
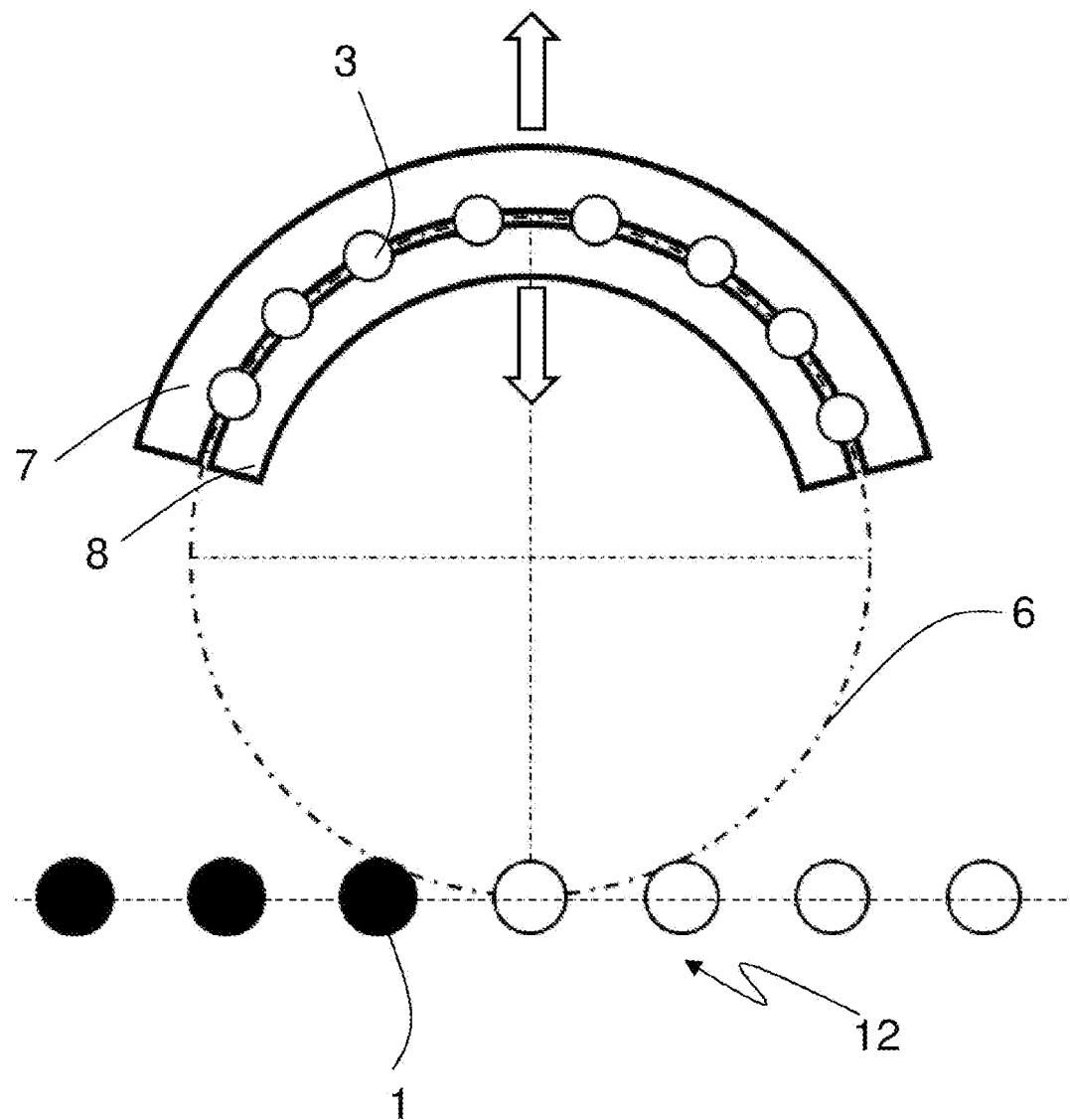
FIG. 1 shows a schematic illustration of an embodiment of the injection mould according to the invention in a top plan view.

The injection mould according to the invention, which is shown in a top plan view in FIG. 1, has a cavity plate 2 with cavities 3 and a core plate 4 with cores 5. As can be seen from the cross-section of a tool cut-out in FIG. 2, the cavities 3 of the cavity plate 2 are supplied with plasticized melt via a hotrunner 9 in order to produce premoulds 1 when the cores 5 are arranged in the closed position of the tool in the cavities 3 (FIG. 2, left).

Figure 2:
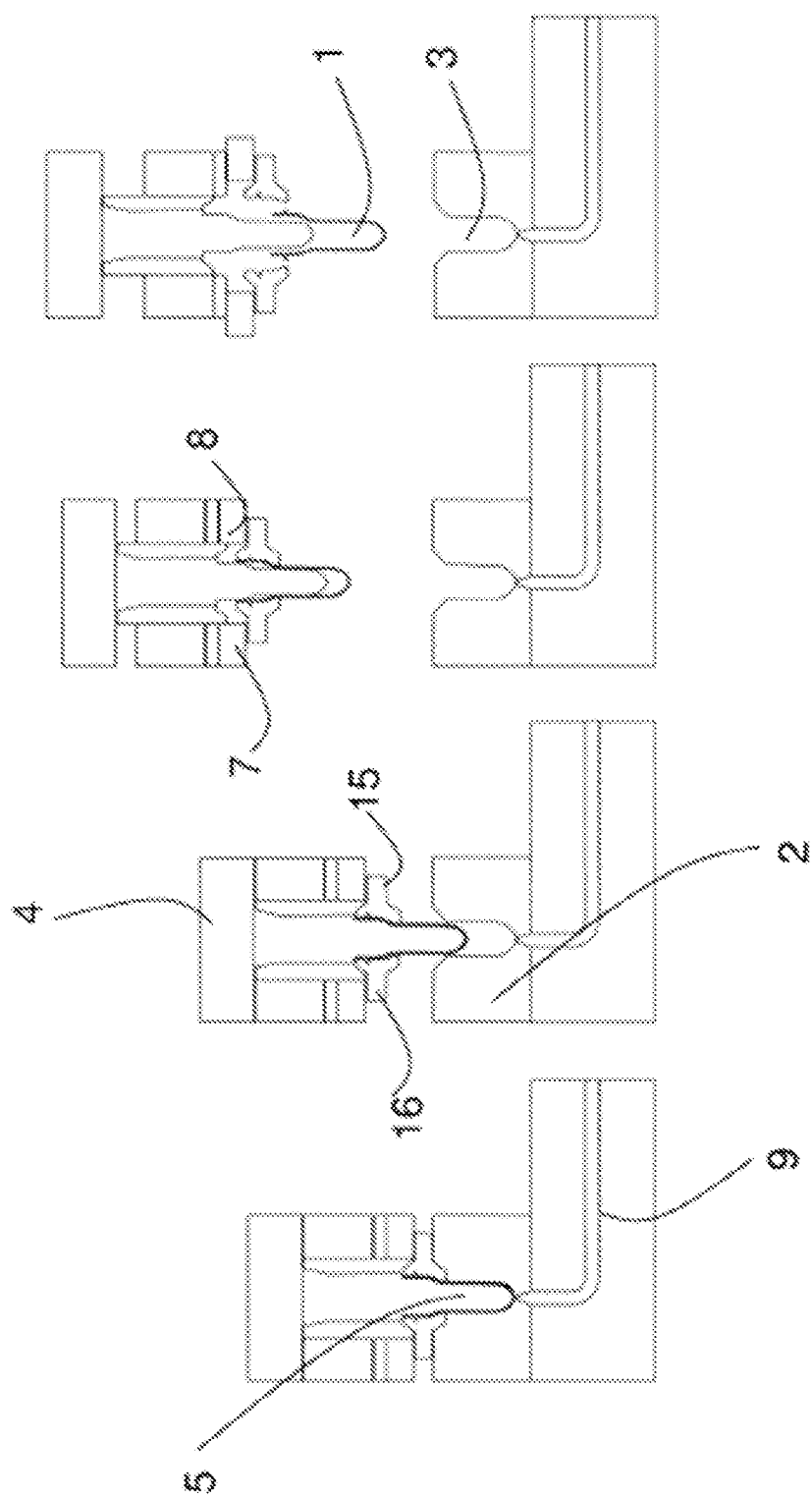
FIG. 2 shows a schematic illustration of a cross-section of a\ cut-out of the injection mould according to the invention at various timepoints of the demoulding process.

In FIG. 2, right, the injection mould is shown in an open position, i.e., no core 5 is arranged within a cavity 3. If, on the other hand, the cavity plate 2 or the core plate 4 is moved relative to the respective other plate into a closed position, a core 5 is arranged in each cavity 3 so that a moulding space for receiving the plasticized melt is formed (FIG. 2, left).

According to the embodiment shown in FIG. 1, the cores 5 and the cavities 3 are arranged on a circular track 6. A removal apparatus 14 is designed in a circular arc and can be moved in the open position of the core plate 4 and the cavity plate 2 by a rotational movement between the two plates 2, 4 in order to remove the produced premoulds 1 from the cores 5 or the cavity 3. When this is done, the removal apparatus 14 passes the premoulds 1 on to a transfer chain 12. The transfer chain 12 transports the produced premoulds to a subsequent machine portion in which the premoulds 1 are further processed.

For this purpose, the transfer chain 12 has gripping elements with which the produced premould pieces 1 are retained. As a result, a sorting of the produced premoulds 1 in the subsequent machining step is not necessary, rather the premoulds 1 are passed on directly in the correct orientation to the subsequent machining step.

The transfer chain 12 also has a transfer chain portion in which the gripping elements are arranged on a straight line, as can be seen in the figures. In the embodiments shown in FIGS. 1 to 5, the removal apparatus 14 transfers the produced premoulds 1 within this transfer chain portion to the gripping elements.

The injection mould according to the shown embodiments further has neck-ring pairs 15, 16, which are associated with each pair consisting of core 5 and cavity 3 and arranged on the core plate 4 and whose inner contour has an inner threading, in which case the inner contour corresponds to a portion of the outer contour of the premould 1 to be produced.

The neck-ring pair 15, 16 can in this case be moved back and forth between a holding position, in which the two neck rings 15, 16 of the neck-ring pair are in contact with one another, and a releasing position, in which the two neck rings 15, 16 of the neck-ring pair are not in contact with one another, by means of slide elements 7, 8. In the two illustrations on the left side of FIG. 2, the slider elements 7, 8 and the neck-ring pairs 15, 16 are located in the retaining position, respectively. In the second illustration on the right of FIG. 2, on the other hand, the slider elements 7, 8 perform a movement that shifts the neck-ring pairs 15, 16 from the holding position, and the releasing position shown on the right illustrations of FIG. 2.

The injection moulding operation process therefore proceeds such that the core 5 is initially arranged completely in the cavity 3, and a plasticized melt is filled in the moulding chamber. As soon as the plasticized melt begins to solidify, the core plate 4 is moved away from the cavity plate 2, whereby the premould is still initially held by the neck-ring pairs 15, 16 on the mould core 5. When the mould core 5 is guided out of the cavity 3, the slider elements 7, 8 perform a movement that moves the neck-ring pairs 15, 16 from the holding position into the releasing position so that the premould 1 can be removed.

The slider elements 7, 8 are configured such that a respective slider element 7 cooperates with a respective neck ring 15 of a neck-ring pair, while the other neck-ring 16 of the neck-ring pair cooperates with the other slider element 8. In this context, according to the embodiments shown in FIGS. 1 as well as 4 to 6, a slider element 7 moves neck rings 15, 16 of different neck-ring pairs, such that a movement of the slider elements 7, 8 moves neck-ring pairs from their holding position into the releasing position or vice versa.

Figure 3:
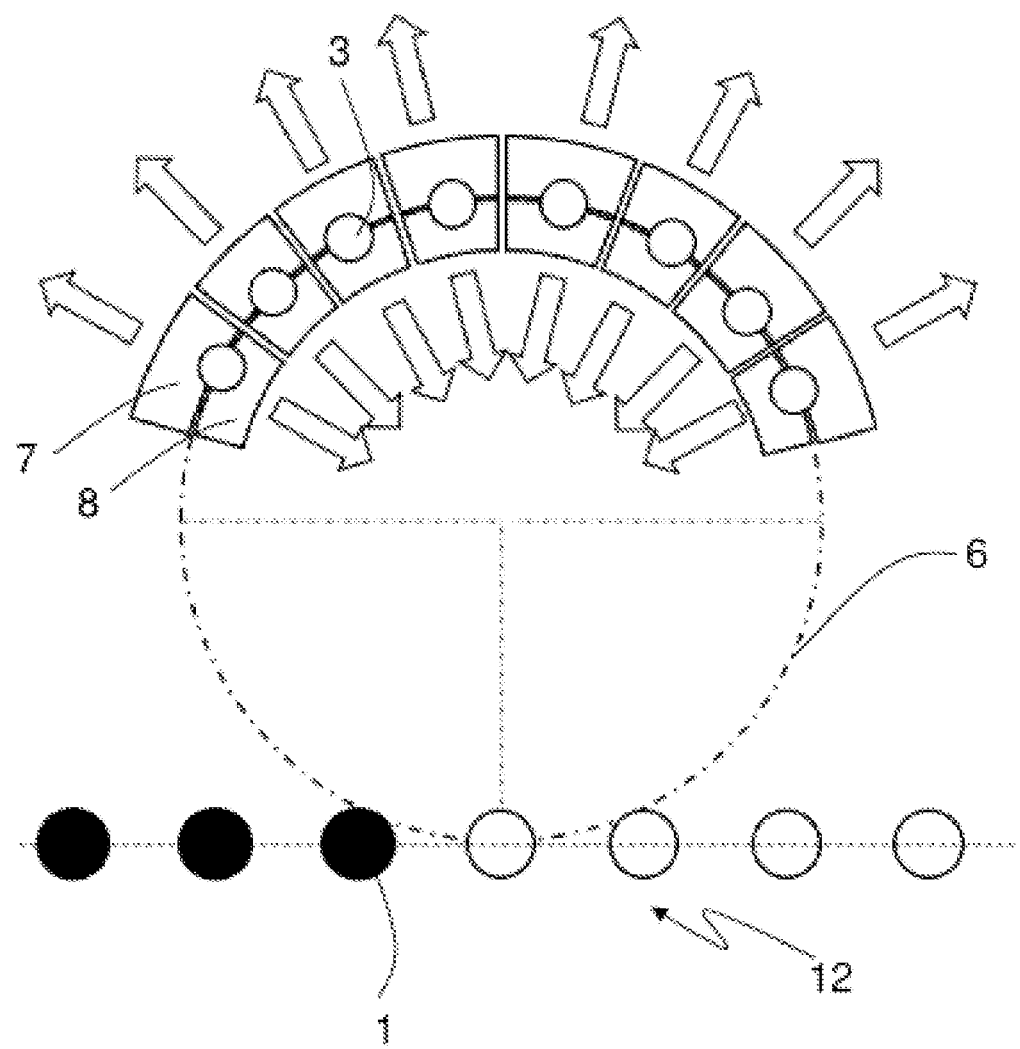
FIG. 3 shows a schematic illustration of an embodiment of the injection mould according to the invention, having separate slider elements.

By contrast, FIG. 3 shows an embodiment in which each pair consisting of core 5 and cavity 3 has associated individual slider elements 7, 8 between the moulding space formed therefrom. Thus, each slider element 7, 8 causes only a movement of a single neck ring 15, 16 such that the neck-ring pairs are opened independently of the adjacent pairs consisting of core 5 and cavity 3.

The slider elements 7, 8 are moved in the radial direction to the circular path 6 during the opening movement, with the slider elements 7, 8 being configured such that they do not impede one another in their movement. For this purpose, the slider elements 7, 8 are designed in a circular arc.

Moreover, the cores 5 and the cavities 3 are arranged on a circular arc 6 such that a centrepoint angle of the circular arc 6 is less than 180°. This above all ensures that a pair consisting of core 5 and cavity 3 does not impede the opening movement of the slider elements 7, 8 when the movement of the slider element does not occur in the radial direction towards the circular path 6, for example, as shown in FIG. 1.

Figure 4:
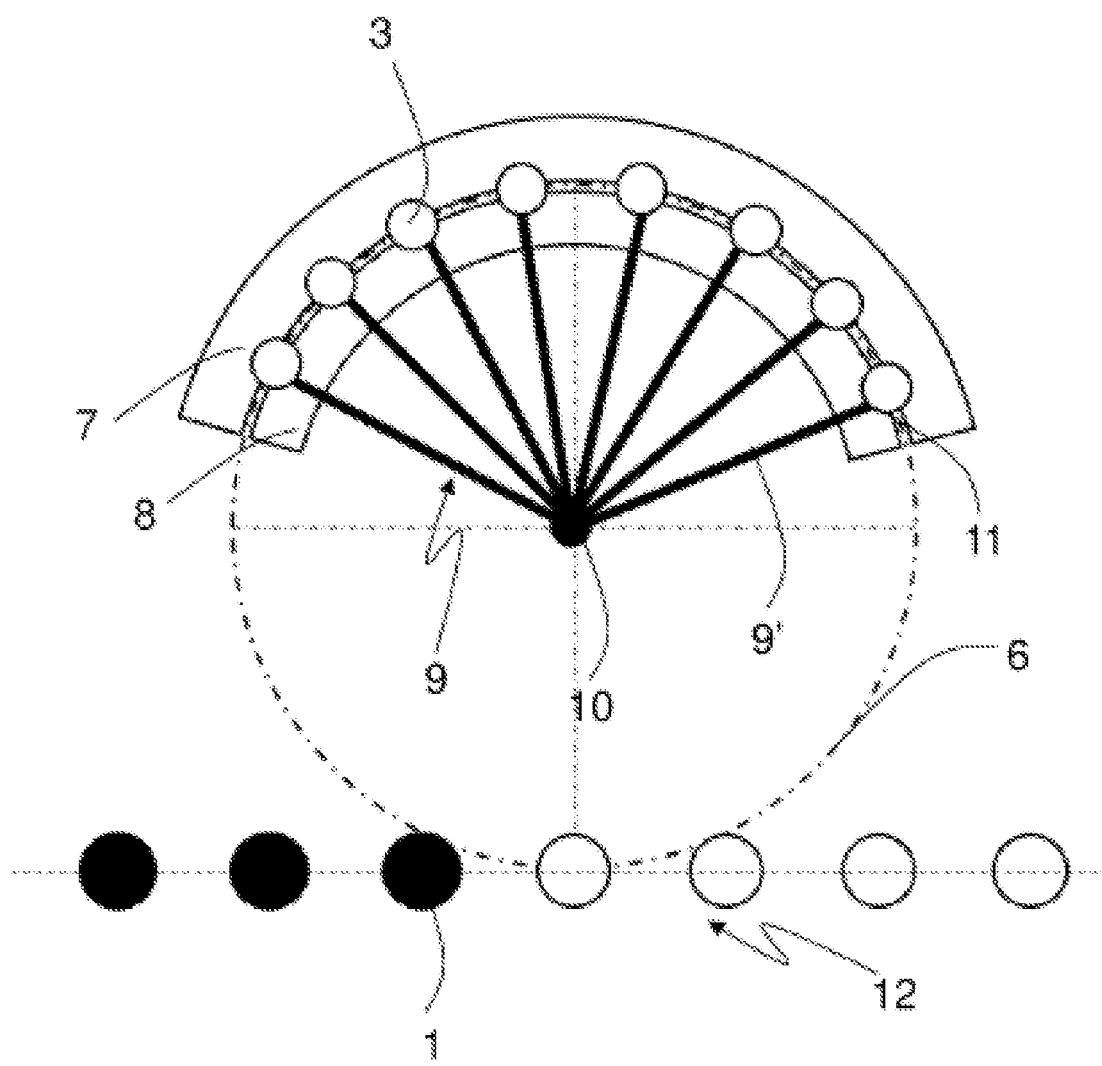
FIG. 4 shows a schematic illustration of the hotrunner of an embodiment of the injection mould according to the invention.

FIG. 4 shows how the cavities 3 are connected to the hotrunner 9 in order to guide a plasticized melt into the moulding spaces when the injection mould is in its closed position.

For this purpose, the hotrunner 9 has an inlet 10 for receiving the plasticized melt, as well as outlets 11 for delivering the plasticized melt to the cavities 3, with the hotrunner 9 being configured such that a hotrunner portion 9' is associated with each cavity 3. In addition, the inlet 10 of the hotrunner is arranged at the centrepoint of the circular arc 6.

The hotrunner portion 9' extends from the inlet 10 of the hotrunner 9 to a gate provided in the cavity 3 for the entry of the plasticized melt. By arranging the inlet 10 of the hotrunner 9 in the centrepoint the circular arc 6, all hotrunner portions 9' are the same length. This offers the advantage that the plasticized melt is exposed to the same environmental influences at each cavity as it enters the cavities 3. This in turn leads to a higher homogeneity within an injection moulding operation of produced premoulds 1.

Figure 5:
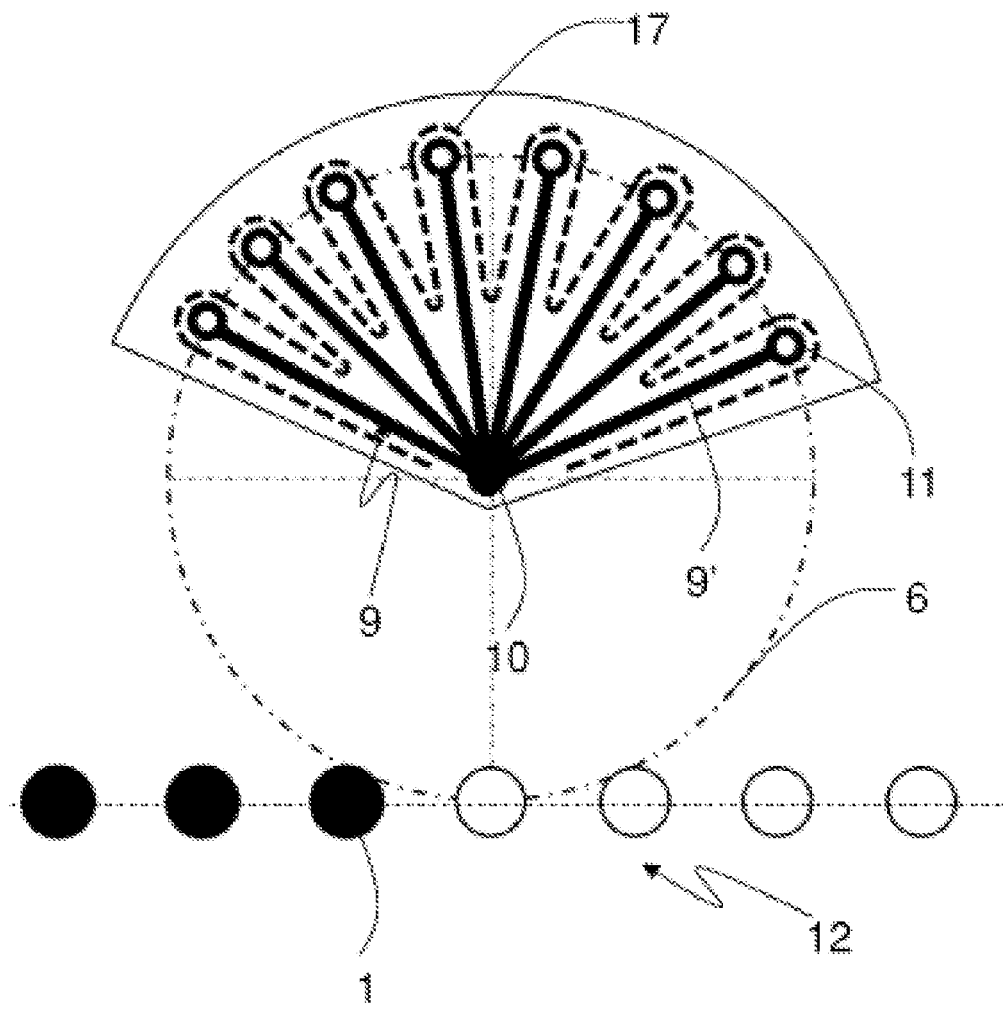
FIG. 5 shows the schematic illustration from FIG. 4 with additional tubular heating bodies arranged about the hotrunner.

FIG. 5 also shows how tubular heating bodies 17 are arranged around the hotrunner 9 in order to maintain a homogeneous temperature in the hotrunner 9. The embodiment of the hotrunner 9 according to the invention offers the advantage that the tubular heating bodies 17 can be arranged in a serpentine manner around the hotrunner portions 9', whereby there are no intersections of the tubular heater elements with one another or with the hotrunner portions 9', such that a very homogeneous temperature distribution in the hotrunner 9 is ensured.

Figure 6:
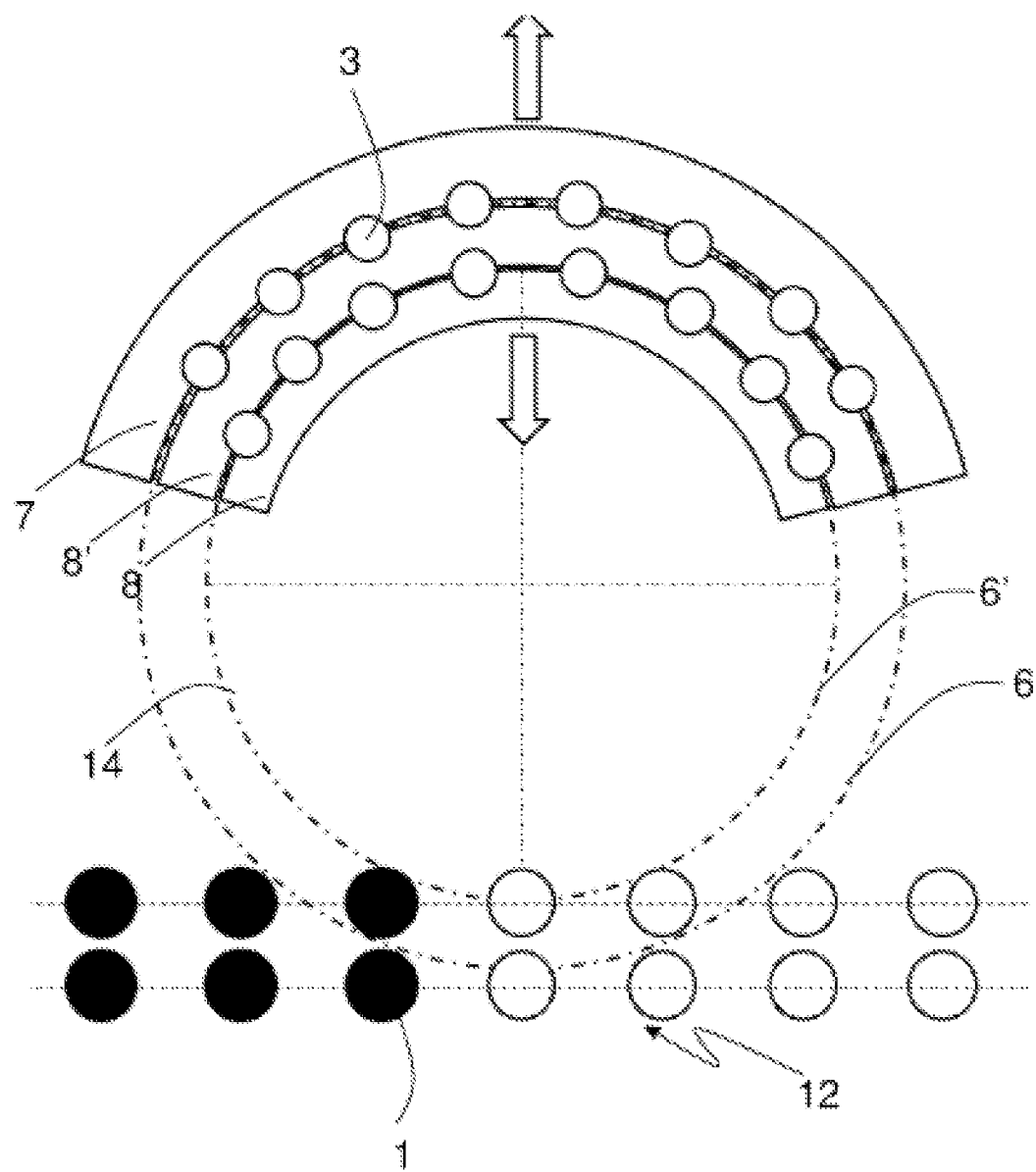
FIG. 6 shows a schematic illustration of an embodiment of the injection mould according to the invention, with the cores or cavities being arranged on two concentric circular paths.

FIG. 6 shows a further embodiment of the injection mould according to the invention, with the cores 5 and the cavities 3 being arranged on a plane on two concentric circular arcs 6, 6' having different radii.

An additional slider element 8' is provided in this case, which moves the neck-ring pairs of the pairs consisting of cores 5 and cavities 3 arranged on the outer circular path 6 as well as the neck-ring pairs of the pairs consisting of cavities 3 and cores 5 arranged on the inner circular path 6'.

In order to demould the produced premoulds 1, therefore, in one embodiment, the slider elements 8' and 8 are first removed from the slider element 7 so that the premoulds 1 can be demoulded on the outer circular path 6 and then the slider elements 7 and 8' are subsequently removed from the slider element 8 so that the produced premoulds 1 can be demoulded on the inner circular path 6'. The demoulding process of the premoulds 1 on the outer circular arc 6 is thus time-delayed to the demoulding process of the premoulds 1 on the inner circular arc 6'.

The removed premoulds 1 are also passed on to a transfer chain 12 in this embodiment using the removal apparatus 14. In the embodiment shown in FIG. 6, however, the transfer chain 12 consists of two parallel paths, on which gripping elements are respectively arranged for receiving the premoulds 1. The premoulds 1 of the outer circular path 6 are in this case arranged on a different path of the transfer chain 12 than the premoulds 1 of the inner circular path 6'.

Figure 7:
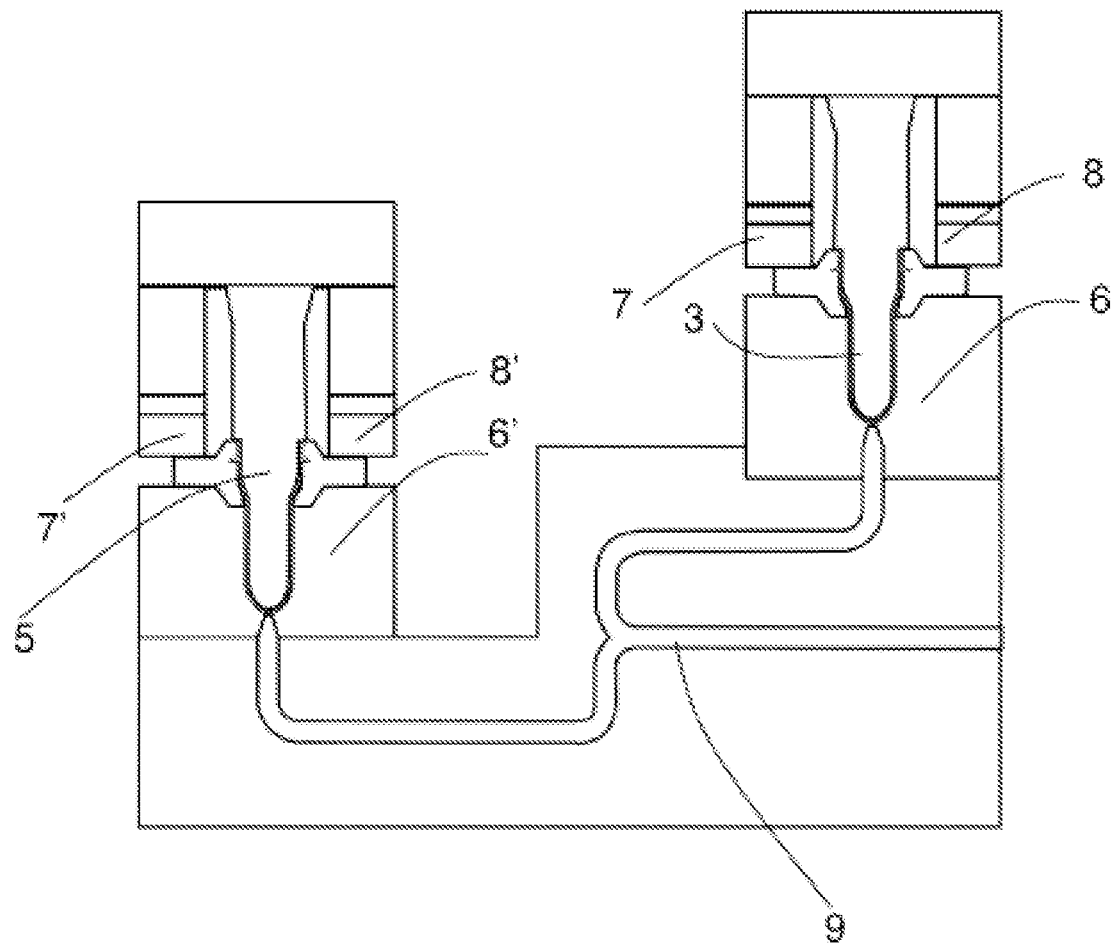
FIG. 7 shows a schematic illustration of a cross-section of an embodiment of the injection mould according to the invention.

Alternatively, as shown in FIG. 7, the slider elements 7, 8 of the concentric circular arcs 6, 6' are also arranged on different planes, such that the cavities 3 and cores 5 on the inner circular path 6' as well as the cavities 3 and cores 5 on the outer circular path 6 each have associated pairs of slider elements 7, 8, 7', 8', and a demoulding of the premoulds 1 can occur simultaneously in that a slider element 7, 8, which is associated with the outer circular path 6, can be moved via a slider element 7', 8' associated with the inner circular path 6'.

In addition, the inner contours of the cavities 3 and/or the outer contours of the cores 5 can be configured differently on the inner circular path 6' than on the outer circular path 6, for example, such that, in the closed position, a different forming space is formed, and premoulds 1 are produced having different outer and inner contours. It would also be conceivable, however, that the premoulds produced in the upper right quadrant of the injection mould will have a different outer contour than premoulds 1 produced in the upper left quadrant of the injection mould. In both embodiments, different premoulds 1 are produced in an injection moulding operation.

Figure 8:
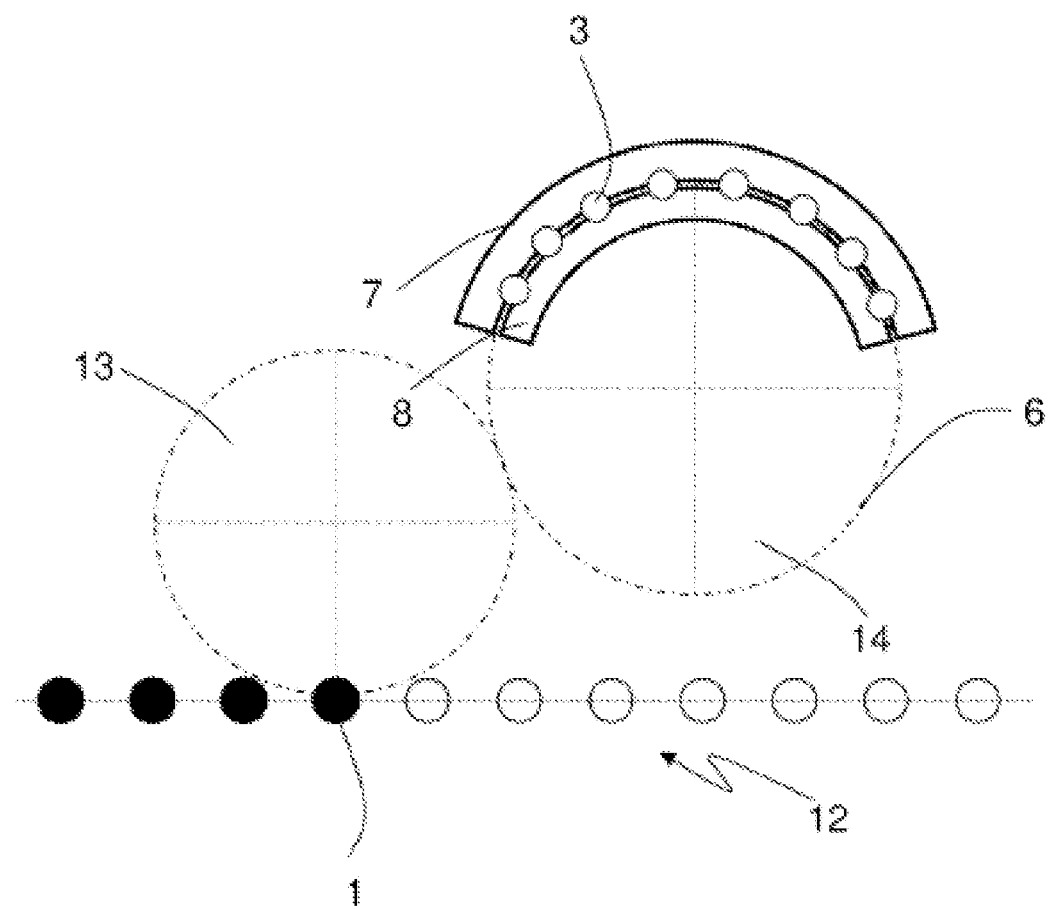
FIG. 8 shows a schematic illustration of an embodiment of the injection mould according to the invention with the follow-up treatment element.

In FIG. 8, a further embodiment of the injection mould according to the invention is shown, whereby the injection mould substantially corresponds to the injection mould shown in FIG. 1, except that the removal apparatus 14 does not transfer the produced premoulds directly to the transfer chain 12, but rather initially to a follow-up treatment element 13, in which the produced premoulds 1 are cooled or otherwise subsequently treated. The follow-up treatment element 13 then transfers the subsequently treated premoulds 13 to the transfer chain 12.

Figure 9:
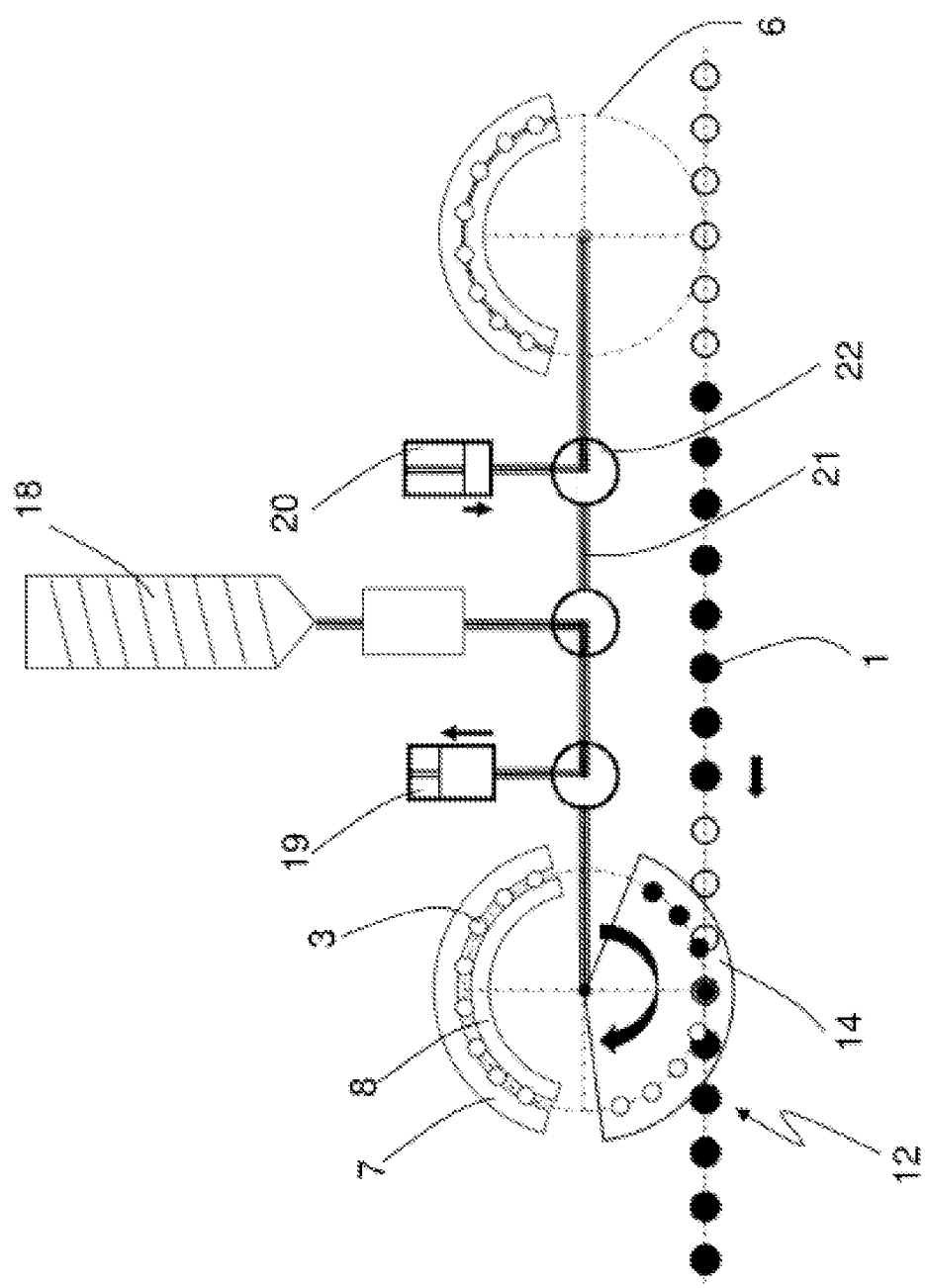
FIG. 9 shows a schematic illustration of an embodiment of the injection moulding system according to the invention at a first method timepoint.
Figure 10:
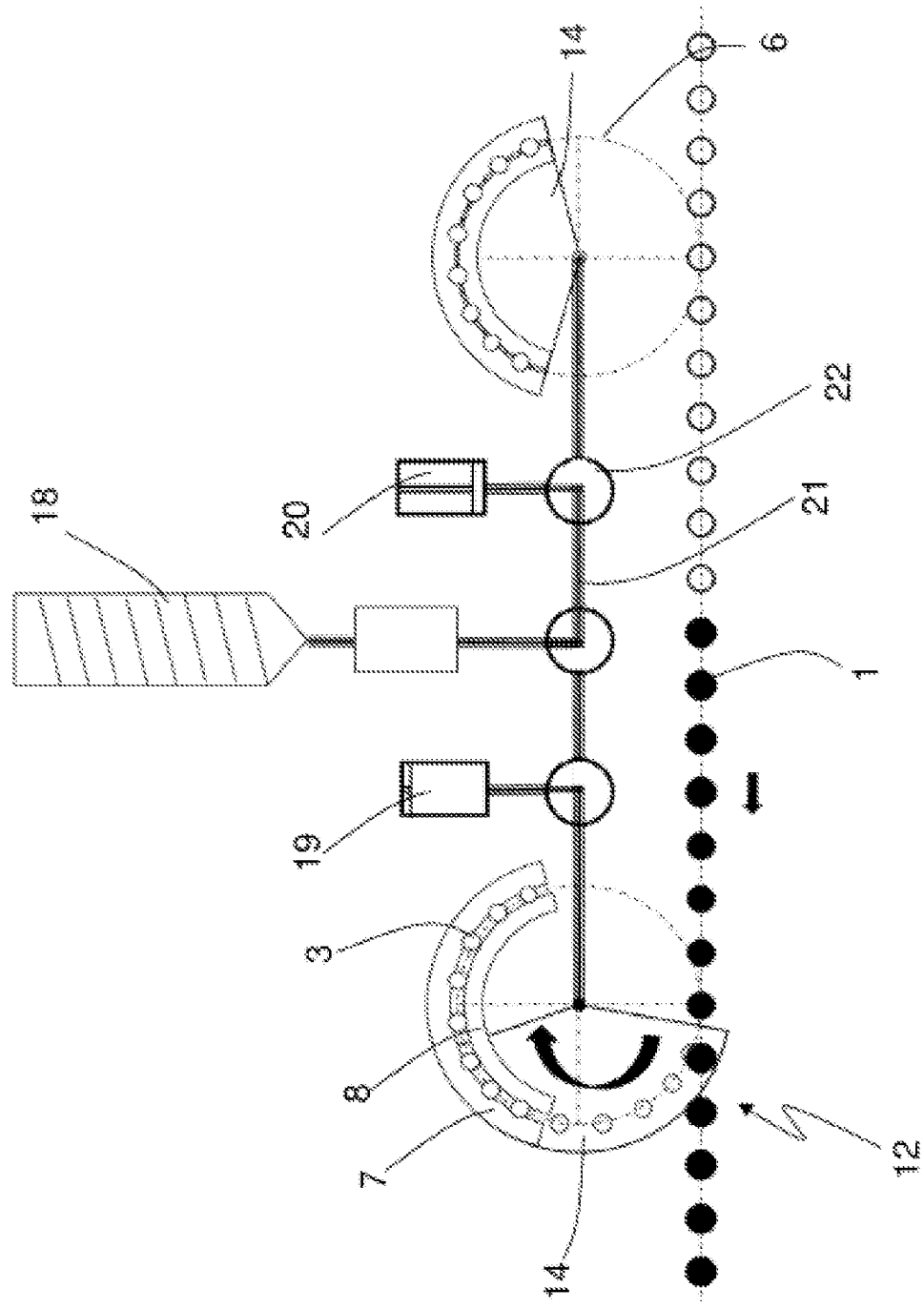
FIG. 10 shows the injection moulding system from FIG. 8 at a second method timepoint.
Figure 11:
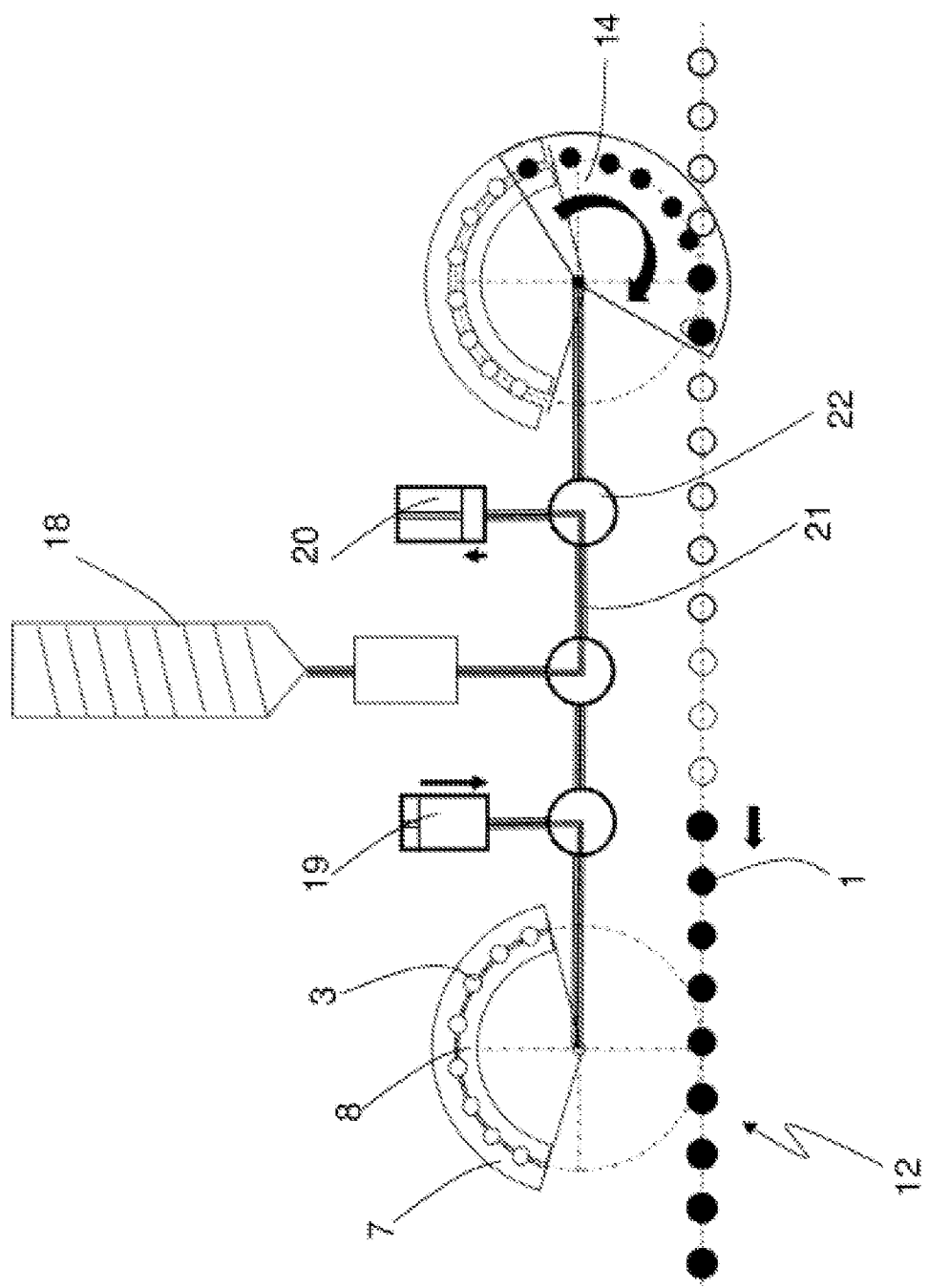
FIG. 11 shows the injection moulding system from FIG. 8 at a third method timepoint.

FIGS. 9 to 11 show an embodiment of an injection moulding system according to the invention having two injection moulds, an extruder, 18 and two injection cylinders 19, 20 associated with the injection moulds.

The extruder 18 is connected to the injection cylinders 19, 20 via melt passages 21. The connection is configured by valves 22 such that either the one injection cylinder 19, 20 or the other injection cylinder 20, 19 is supplied with a plasticized melt.

FIG. 9 shows the case in which the injection cylinder 19 of the left of the two injection moulds is being filled with plasticized melt, while the premoulds 1 produced in the injection mould are transferred to the transfer chain 12 using the removal apparatus 14. The left injection mould is thus in the open position at the method timepoint shown in FIG. 9. The right of the two injection moulds, on the other hand, is in the closed position and is supplied with plasticized melt by the injection cylinder 20.

FIG. 10 then shows the method timepoint at which the injection event in the right injection mould is completed, i.e., the injection cylinder 20 is completely emptied. In the left injection mould, all produced premoulds 1 are also transferred to the transfer chain 12.

In FIG. 11, the correspondingly inverted behaviour to FIG. 8 is then shown. The injection cylinder 20 of the right injection mould is filled while the premoulds produced in this tool are transferred to the transfer chain 12 using the removal apparatus 14 of the right injection mould. For this purpose, the right tool is in its open position. At the same time, a new injection event takes place on the left injection mould, i.e., the left mould is in its closed position.

Thus, it can be enabled that the plasticized melt is extruded using the extruder 18 without interruption, and thus higher-quality premoulds 1 can be produced within a short time.

REFERENCE SIGNS

1 Premould
2 Cavity plate
3 Cavity
4 Core plate
Core
6 Curved path/outer circular arc
6' Inner circular arc
7, 8, 7', 8' Slider elements
9 Hotrunner
9' Hotrunner portion
Input of hotrunner
11 Outlet of hotrunner
12 Transfer chain
13 Follow-up treatment element
14 Removal apparatus
15, 16 Neck rings
17 Tubular heating body
18 Extruder
19, 20 Injection cylinder
21 Melt passage
22 Valve

The invention claimed is:

1. An injection mould, for producing mouldings, having a cavity plate which has cavities, the inner contour of which corresponds at least to a portion of the outer contours of the mouldings to be produced, and a core plate which has cores, the outer contour of which corresponds at least to a portion of the inner contours of the mouldings to be produced,
wherein the cavity plate and the core plate are movable back and forth relative to one another between a closed position, in which each core is respectively arranged in a cavity, and an open position, in which no core is arranged within a cavity,
wherein, in the closed position, a moulding space for receiving a plasticized melt is formed by each cavity and the core arranged therein,
wherein each moulding space is assigned a neck-ring pair made up of two neck rings,
wherein the inner contour of the neck-ring pair corresponds to a portion of the outer contour of the moulding to be produced,
wherein the neck-ring pair is arranged on the core plate and can be moved back and forth between a holding position, in which the two neck rings of the neck-ring pair are in contact with one another, and a releasing position, in which the two neck rings of the neck-ring pair are not in contact with one another, and
wherein the cores and the cavities are arranged on a curved path.

2. The injection mould according to claim 1, wherein the core plate is pivotable about a pivot axis in the open position in order to remove the produced mouldings from the injection mould, or that a removal apparatus is provided, which is movable in the open position between the core plate and the cavity plate and is provided in order to remove produced mouldings from the cores or the cavities.

3. The injection mould according to claim 1, wherein two slider elements are provided, which are arranged and configured in such a way that one neck ring of the neck-ring pair cooperates with the one slider element, while the other neck ring of the neck-ring pair cooperates with the other slider element, so that, when the injection mould is moved from the closed position into the open position, the neck rings are moved from their holding position into the releasing position by a movement of the slider elements.

4. The injection mould according claim 3, wherein the cores and the cavities are arranged on a circular arc.

5. The injection mould according to claim 3, wherein the cores and the cavities are arranged on a circular arc,
wherein the slider elements are circularly arcuate in form, and
wherein a single slider element of the two slider elements moves neck rings of neck-ring pairs such that neck rings are moved due to the movement of the single slider element, or that two single slider elements are associated with each moulding space, which only move the neck-ring pair of the respective moulding space.

6. The injection mould according to claim 1, wherein the cores and the cavities are arranged on a circular arc having a centrepoint angle, and
wherein the centrepoint angle is less than 180°.

7. The injection mould according to claim 2, wherein the cores and the cavities are arranged on two concentric circular arcs having different radii.

8. The injection mould according to claim 7, wherein ends of the cavities or cores which are jointly mounted on an outer circular arc of the concentric circular arcs span a first plane,
wherein ends of the cavities or cores which are jointly arranged on an inner circular arc of the concentric circular arcs span a second plane, and
wherein the first plane and the second plane are arranged parallel and spaced apart from one another.

9. The injection mould according to claim 5, wherein the cores and the cavities are arranged on a circular arc having a centrepoint angle,
wherein the centrepoint angle is less than 180°,
wherein a hotrunner is provided, which has an inlet for receiving a plasticized melt and outlets for delivering the plasticized melt to the cavities, wherein the hotrunner is arranged in such a way that the inlet is arranged in a centrepoint of the circular arc, wherein each cavity is associated with a hotrunner portion, which extends from a gate provided in the cavity to the inlet, and wherein all hotrunner portions are the same length.

10. The injection mould according to claim 1, wherein the pairs consisting of cavity and associated core form at least two groups, and wherein the inner contour of the cavity and/or the outer contour of the core of the one group differ from the inner contour of the cavity and/or the outer contour of the core of the other group.

11. The injection mould according to claim 2, wherein a transfer chain having gripping elements is provided for holding a produced moulding, and wherein the core plate is configured such that, using the core plate, the produced mouldings can be transferred in the open position from the cores to the gripping elements, or wherein the removal apparatus is configured in such a way that, using the removal apparatus, the produced mouldings can, in the open position, be removed from the cores or from the cavities and transferred to the gripping elements.

12. The injection mould according to claim 11, wherein the transfer chain has at least one transfer chain portion, in which the gripping elements are arranged on a straight line and wherein, using the removal apparatus, the produced mouldings can be transferred within this transfer chain portion to the gripping elements.

13. The injection mould according to claim 2, wherein two slider elements are provided, which are arranged and configured in such a way that one neck ring of the neck-ring pair cooperates with the one slider element, while the other neck ring of the neck-ring pair cooperates with the other slider element, so that, when the injection mould is moved from the closed position into the open position, the neck rings are moved from their holding position into the releasing position by a movement of the slider elements, wherein a follow-up treatment element is provided, wherein the core plate or the removal apparatus transfers the mouldings removed from the injection mould to the follow-up treatment element, and wherein the follow-up treatment element transfers the mouldings to the transfer chain.

14. The injection mould according to claim 2, wherein the cores and the cavities are arranged on a circular arc, wherein the slider elements are circularly arcuate in form, and wherein the removal apparatus is configured as a circular arc and is moved between the cavity plate and the core plate by a rotational movement.

15. An injection moulding system having at least one injection mould according to claim 1 and an extruder, wherein the extruder is connected to the injection mould via a melt passage such that, during operation of the injection moulding system, the plasticized melt is guided from the extruder into the injection mould.

16. The injection moulding system according to claim 15, wherein the moulding space is arranged stationary opposite the extruder in the closed position of the cavity plate and the core plate.

17. The injection moulding system according to claim 15, wherein the injection moulding system has at least two injection moulds as well as injection cylinders associated with the at least two injection moulds, wherein the at least two injection moulds are connected to the injection cylinder via the melt passage, wherein the injection cylinders are connected to the extruder via at least one further melt passage, and wherein, during operation of the injection moulding system, the injection cylinders are alternately supplied with the plasticized melt from the extruder, such that either the one of the at least two injection moulds is in the closed position and the other injection mould of the at least two injection moulds is in the open position, or vice versa.

18. The injection mould according claim 4, wherein the slider elements are circularly arcuate in form.

19. The injection mould according to claim 7, wherein the removal apparatus is designed and configured in such a way that, using the removal apparatus, mouldings from the cores or the cavities of both concentric circular arcs can be removed, in that the removal apparatus is adjusted to the radius of the circular arcs.

20. The injection mould according to claim 14, wherein the rotational movement is about a centrepoint of the circular arc.

* * * * *